US011125427B2

(12) United States Patent
Trivelpiece et al.

(10) Patent No.: US 11,125,427 B2
(45) **Date of Patent: *Sep. 21, 2021**

(54) SYSTEMS AND METHODS FOR USING A HYBRID LIGHTING AND INVENTORY SYSTEM FOR MOTION DETECTION

(71) Applicants: Steve E. Trivelpiece, Rancho Santa Margarita, CA (US); Adam S. Bergman, Boca Raton, FL (US); Craig E. Trivelpiece, Mission Viejo, CA (US); Eric F. Riggert, Trabuco Canyon, CA (US); David P. McCullough, Rancho Santa Margarita, CA (US)

(72) Inventors: Steve E. Trivelpiece, Rancho Santa Margarita, CA (US); Adam S. Bergman, Boca Raton, FL (US); Craig E. Trivelpiece, Mission Viejo, CA (US); Eric F. Riggert, Trabuco Canyon, CA (US); David P. McCullough, Rancho Santa Margarita, CA (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/401,314

(22) Filed: May 2, 2019

(65) Prior Publication Data

US 2020/0263863 A1 Aug. 20, 2020

Related U.S. Application Data

(63) Continuation-in-part of application No. 16/279,222, filed on Feb. 19, 2019.

(51) Int. Cl.
*F21V 23/04* (2006.01)
*H05B 45/22* (2020.01)
(Continued)

(52) U.S. Cl.
CPC ...... *F21V 23/0471* (2013.01); *F21V 23/0485* (2013.01); *H05B 45/22* (2020.01); *H05B 47/105* (2020.01); *H05B 47/19* (2020.01)

(58) Field of Classification Search
CPC ........ F21V 23/0471; F21K 9/00; F21K 9/232; H05B 45/10; H05B 45/20; Y02B 20/445; Y02B 20/44
See application file for complete search history.

(56) References Cited

U.S. PATENT DOCUMENTS 8,013,545 B2 9/2011 Jonsson
9,672,396 B1 * 6/2017 Bookman ............ G06Q 10/087
(Continued)

FOREIGN PATENT DOCUMENTS

EP 2642437 A1 9/2013
WO 2016048790 A1 3/2016

OTHER PUBLICATIONS

European Search Report issued in corresponding International Applicaton No. EP20158190.7 dated Apr. 24, 2020.

*Primary Examiner* — Mirza F Alam
(74) *Attorney, Agent, or Firm* — Arent Fox LLP

(57) ABSTRACT

Systems and methods for detecting a presence of a person, robot or object in a given area using a hybrid Lighting and Inventory ("LI") system. The methods comprise: maintaining a data store of identifiers for first tags that are readable by an internal circuit of at least one light provider; tracking (a) changes in which of said first tags are read by the at least one light provider's internal circuit during consecutive tag read processes and (b) changes in power levels of tag read signals received at the at least one light provider during the consecutive tag read processes; and using tracked information (a) and (b) to detect the presence of the person, robot or object in the given area.

20 Claims, 11 Drawing Sheets

Retail Store Facility 100
Room 104
102
Room 106
Room 108
Room 110
Tag 122
Tag 112
RFID Reader(s) 116
Network Control System 114
Beacon Reader(s) 118
Display System(s) 120

(51) Int. Cl.

| | |
|---|---|
| ***H05B 47/19*** | (2020.01) |
| ***H05B 47/105*** | (2020.01) |

(56) References Cited

U.S. PATENT DOCUMENTS

| | | | | |
|---|---|---|---|---|
| 9,818,083 | B1 | 11/2017 | Lauka et al. | |
| 9,846,795 | B2 | 12/2017 | Russell | |
| 10,096,219 | B1 | 10/2018 | Maurer et al. | |
| 10,346,657 | B1 * | 7/2019 | White | G06K 7/10099 |
| 2012/0026726 | A1 * | 2/2012 | Recker | F21V 21/0824 362/157 |
| 2012/0235579 | A1 * | 9/2012 | Chemel | F21V 21/15 315/152 |
| 2013/0241699 | A1 * | 9/2013 | Covaro | G06K 7/10009 340/10.1 |
| 2014/0285095 | A1 * | 9/2014 | Chemel | F21S 2/005 315/152 |
| 2016/0092704 | A1 * | 3/2016 | Russell | G06K 7/10009 340/10.3 |
| 2019/0080280 | A1 * | 3/2019 | Tingler | G06K 7/10475 |

* cited by examiner 702
716
Tag 700
Communication Enabled Device 704
Communication Device 706
Controller 710
Instructions 722
Memory 708
Instructions 722
Unique ID 724
Item Level Info. 726
Clock/Timer 714
Input/Output Device(s) (e.g., LEDs, buzzer) 712
Optional Location Module 730
Energy Harvesting Circuit 732
Power Management Circuit 734
Optional Coupler (e.g., push button, threaded actuator, motor, switch, pin, pad, clamp, tamper wiring, etc.) 742

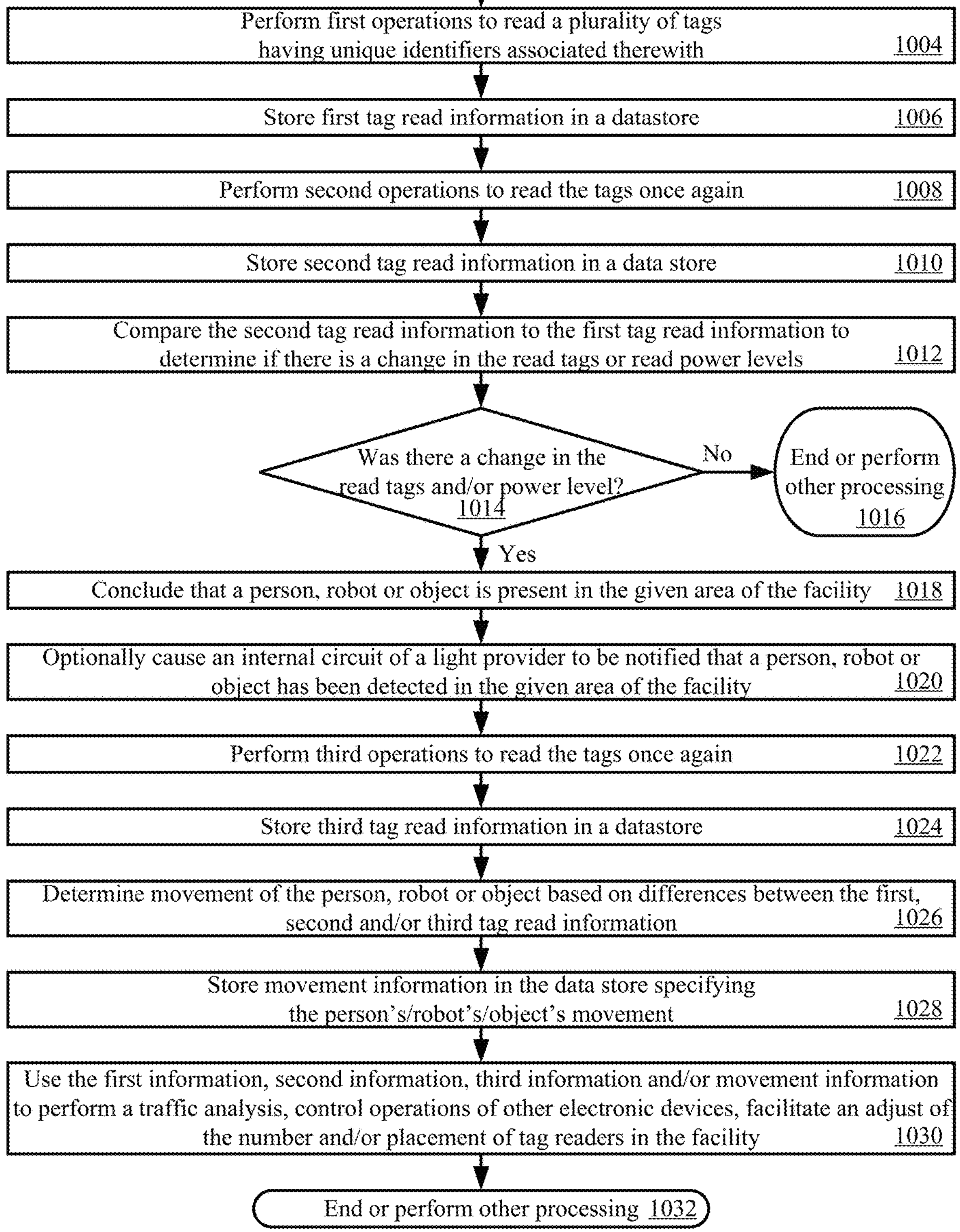
1000
Begin 1002
FIG. 10
Perform first operations to read a plurality of tags having unique identifiers associated therewith 1004
Store first tag read information in a datastore 1006
Perform second operations to read the tags once again 1008
Store second tag read information in a data store 1010
Compare the second tag read information to the first tag read information to determine if there is a change in the read tags or read power levels 1012
Was there a change in the read tags and/or power level? 1014
No
End or perform other processing 1016
Yes
Conclude that a person, robot or object is present in the given area of the facility 1018
Optionally cause an internal circuit of a light provider to be notified that a person, robot or object has been detected in the given area of the facility 1020
Perform third operations to read the tags once again 1022
Store third tag read information in a datastore 1024
Determine movement of the person, robot or object based on differences between the first, second and/or third tag read information 1026
Store movement information in the data store specifying the person's/robot's/object's movement 1028
Use the first information, second information, third information and/or movement information to perform a traffic analysis, control operations of other electronic devices, facilitate an adjust of the number and/or placement of tag readers in the facility 1030
End or perform other processing 1032

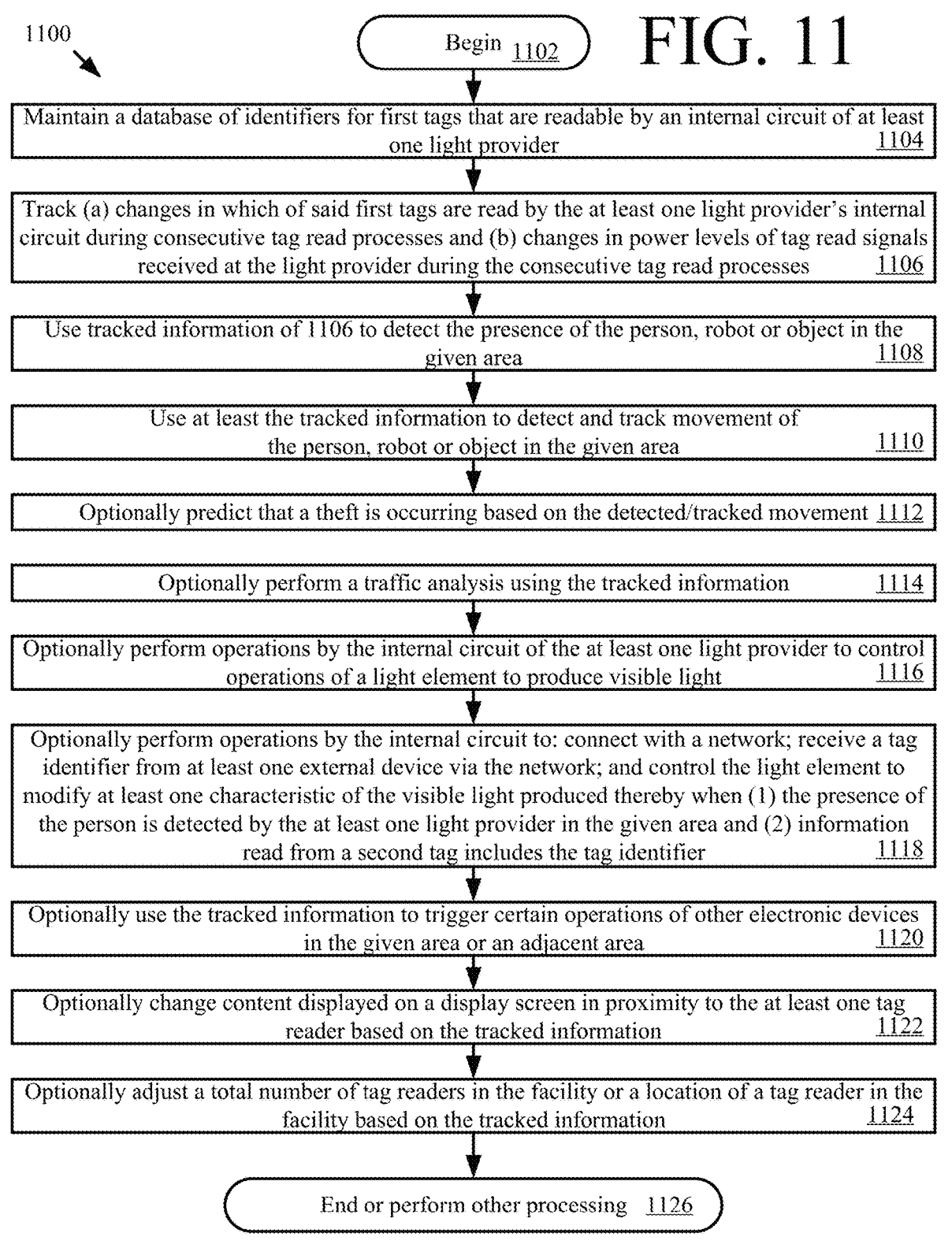

1100

Begin 1102

FIG. 11

Maintain a database of identifiers for first tags that are readable by an internal circuit of at least one light provider 1104

Track (a) changes in which of said first tags are read by the at least one light provider's internal circuit during consecutive tag read processes and (b) changes in power levels of tag read signals received at the light provider during the consecutive tag read processes 1106

Use tracked information of 1106 to detect the presence of the person, robot or object in the given area 1108

Use at least the tracked information to detect and track movement of the person, robot or object in the given area 1110

Optionally predict that a theft is occurring based on the detected/tracked movement 1112

Optionally perform a traffic analysis using the tracked information 1114

Optionally perform operations by the internal circuit of the at least one light provider to control operations of a light element to produce visible light 1116

Optionally perform operations by the internal circuit to: connect with a network; receive a tag identifier from at least one external device via the network; and control the light element to modify at least one characteristic of the visible light produced thereby when (1) the presence of the person is detected by the at least one light provider in the given area and (2) information read from a second tag includes the tag identifier 1118

Optionally use the tracked information to trigger certain operations of other electronic devices in the given area or an adjacent area 1120

Optionally change content displayed on a display screen in proximity to the at least one tag reader based on the tracked information 1122

Optionally adjust a total number of tag readers in the facility or a location of a tag reader in the facility based on the tracked information 1124

End or perform other processing 1126

SYSTEMS AND METHODS FOR USING A HYBRID LIGHTING AND INVENTORY SYSTEM FOR MOTION DETECTION

CROSS-REFERENCE TO RELATED APPLICATION

The present application is a Continuation-In-Part of U.S. patent Ser. No. 16/279,222, filed on Feb. 19, 2019 and entitled "SYSTEMS AND METHODS FOR DETERMINING AN INVENTORY USING A HYBRID LIGHTING AND INVENTORY SYSTEM", which is incorporated herein by reference.

BACKGROUND

Statement of the Technical Field

The present disclosure relates generally to lighting networks, inventory tracking systems, and motion detection systems. More particularly, the present disclosure relates to implementing systems and methods for using a hybrid lighting and inventory system for motion detection.

Description of the Related Art

Light bulb networks have been developed to facilitate home automation. The light bulb networks comprise smart light bulbs that are configured to fit in conventional light fixtures, and to wirelessly communicate with a home automation system and/or each other. The home automation system controls the on/off state of the smart light bulbs, as well as the intensity and/or color of light emitted from the smart light bulbs.

RFID systems are commonly used for monitoring items (e.g., goods and equipment) and recording information on the items. An RFID system typically includes an RFID reader and an RFID device such as a tag or label. The RFID reader may transmit a Radio-Frequency ("RF") carrier signal to the RFID device. The RFID device may respond to the RF carrier signal (or interrogator signal) with a data response signal (or authentication reply signal) encoded with information stored on the RFID device. RFID devices may store information such as a unique identifier or an Electronic Product Code ("EPC") associated with an article or item.

Indoor proximity systems have also been developed. One conventional indoor proximity system is known as iBeacon®. iBeacon® employs Bluetooth communication technology to connect to mobile communication devices (e.g., cellular phones). Upon establishment of such connection, the iBeacon® requests and receives first information from each Mobile Communication Device ("MCD"). The first information includes information which has been agreed upon by the cell user for provision to the iBeacon®. The iBeacon® can also push second information to the MCD. The Bluetooth communication technology is based on a 2.45 GHz transmission, and its data rate ranges from 1 Mbit to 24 Mbit.

SUMMARY

The present disclosure concerns implementing systems and methods for detecting a presence of a person, robot or object in a given area using a hybrid Lighting and Inventory ("LI") system. The methods comprise maintaining a data store of identifiers for first tags that are readable by an internal circuit of at least one light provider. The light provider is coupled to a light fixture installed on a physical structure of the facility. The methods also comprise: tracking (a) changes in which of the first tags are read by the at least one light provider's internal circuit during consecutive tag read processes and (b) changes in power levels of tag read signals received at the at least one light provider during the consecutive tag read processes; and using tracked information (a) and (b) to detect the presence of the person, robot or object in the given area. The first tags may have unknown locations in the facility, variable locations in the facility, or known static locations in the facility.

The methods may also comprise: using the tracked information (a) and (b) to detect and track movement of the person, robot or object in the given area; predicting that a theft is occurring based on detected and tracked movement of the person, robot or object; performing a traffic analysis using the tracked information (a) and (b); using the tracked information (a) and (b) to trigger certain operations of other electronic devices (e.g., tag reader, a light, and a display) in the given area or an adjacent area; changing content displayed on a display screen in proximity to the at least one light provider based on the tracked information (a) and (b); and/or adjusting a total number of tag readers in the facility or a location of a tag reader in the facility based on the tracked information (a) and (b).

The methods may further comprise: reading the first tags using a first signal frequency during a first tag read process; reading the first tags using a second signal frequency during a second tag read process; and using the first and second frequencies to facilitate the detection and tracking of the movement.

In some scenarios, the methods comprise: performing operations by the internal circuit of the at least one light provider to control operations of a light element to produce visible light; connect with a network; receive a tag identifier from at least one external device via the network; and control the light element to modify at least one characteristic of the visible light produced thereby when (1) the presence of the person is detected by the at least one light provider in the given area and (2) information read from a second tag includes the tag identifier.

BRIEF DESCRIPTION OF THE DRAWINGS

The present solution will be described with reference to the following drawing figures, in which like numerals represent like items throughout the figures.

FIG. 10 is an illustrative method for detecting the presence of and/or tracking movement of a person, robot or object in a given area of a facility.

FIG. 11 is an illustrative method for detecting a presence of a person, robot or object in a given area (a) without use of a camera system and/or (b) using a hybrid LI system.

DETAILED DESCRIPTION

Figure 1:
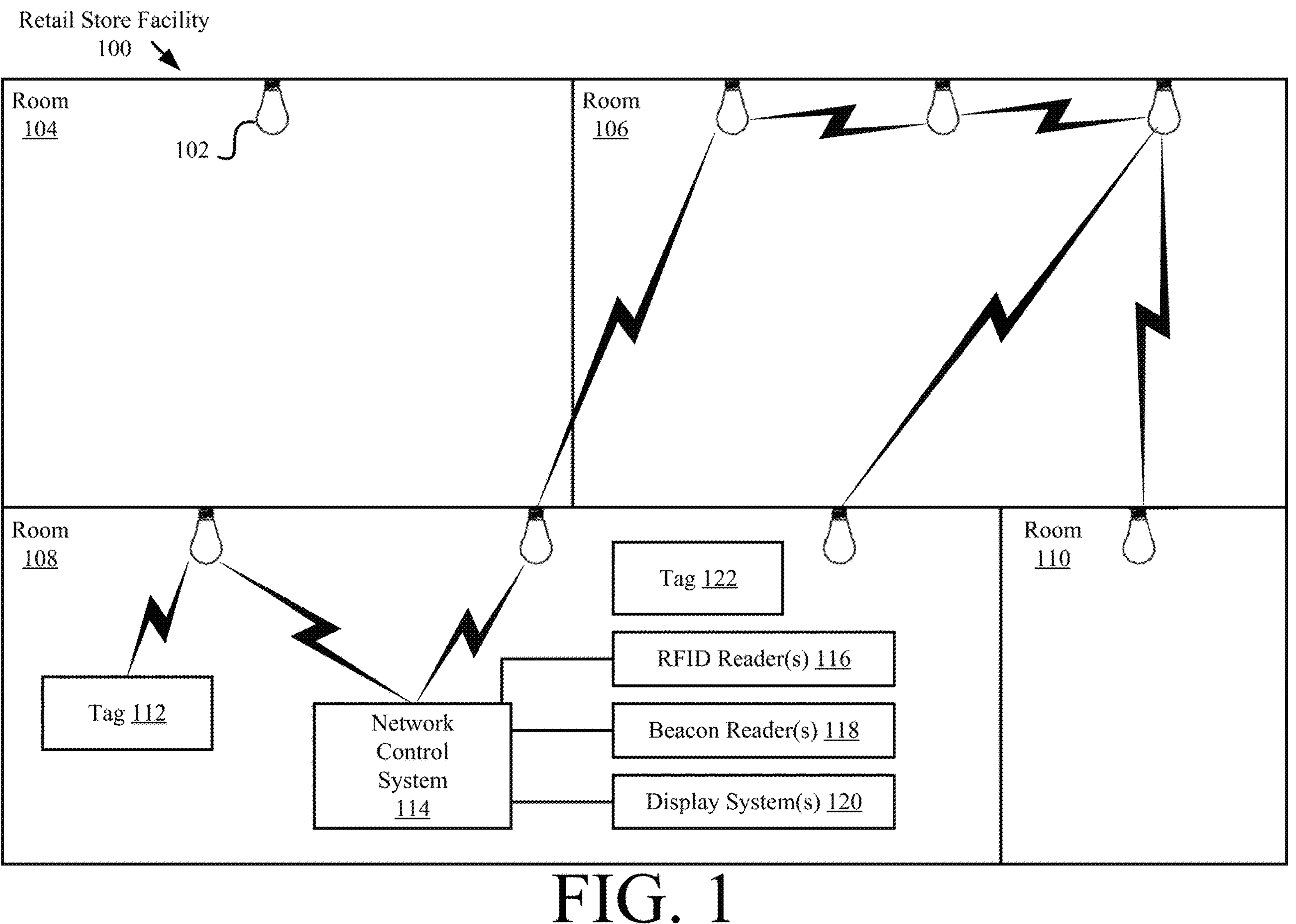
FIG. 1 is an illustration of an illustrative architecture for a retail store facility.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present solution may be embodied in other specific forms without departing from its spirit or essential characteristics. The described embodiments are to be considered in all respects only as illustrative and not restrictive. The scope of the present solution is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present solution should be or are in any single embodiment of the present solution. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One skilled in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

Reference throughout this specification to "one embodiment", "an embodiment", or similar language means that a particular feature, structure, or characteristic described in connection with the indicated embodiment is included in at least one embodiment of the present solution. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present solution generally concerns systems and methods for determining an inventory using a hybrid lighting and inventory system. The methods involve: performing operations by an internal circuit of a light provider to control operations of a light element (e.g., a light bulb or a light tube) to produce visible light, where the light provider is coupled to a light fixture installed on a physical structure (e.g., a wall, ceiling, floor, display equipment, Point of Sale ("POS") station, racks, etc.) of a facility (e.g., a retail store facility); and performing operations by the internal circuit to connect with a network, receive a tag identifier associated with an alert event from at least one external device via the network, read tags, and control the light element to modify at least one characteristic of the visible light produced thereby when information read from one of the tags includes the tag identifier and/or a person has been detected in the same coverage area as the tag. The tag reads may be performed in a manner that minimizes an effect of heat generated by the internal circuit on a life of the light element.

Currently people motion is detected using cameras placed on the ceiling of buildings. This technique has privacy issues with pictures of humans being taken that can be viewed by people with access to the cameras. Therefore, there is a need for a novel solution that eliminates or reduces any privacy issues associated with human detection/tracking. The present solution provides such a novel solution.

Thus, the present solution also concerns systems and methods for using the hybrid lighting and inventory system for motion detection. The methods generally involve: maintaining a data store (e.g., a database) of tags that can be read under at least one fixed tag reader; tracking changes in tag reads and changes in the power of the tag reads; and using the tracked information to determine motion of a human, robot or object in a coverage area of the tag reader. Privacy issues are eliminated or reduced through the use of the tag reader(s) to determine human/robot/object motion. Also, the cost of implementing a human/robot/object detection/tracking system is reduced since the requirement for cameras has also been eliminated or reduced. In addition, the tracked information can be used for traffic analysis (e.g., a total count of people in a given area during a certain period of time) and triggering certain operations of other electronic devices (e.g., turning on or enabling tag reads by an adjacent tag reader, turning on or off at least one light in proximity to the tag reader(s), and/or turning on or changing content displayed on a display screen in proximity to the tag reader(s)). The present solution is not limited to the tag read implementation. Additionally or alternatively, a beacon based system can be used to detect and track human/robot/object motion in an area.

The theory of the present solution is that humans/robots/objects moving in the coverage area (or read zone) of a tag reader will block reads of some tag tags and cause reflections of RF signals that will change the read power of other tags. These changes in tag reads and read power relative to respective baseline values (or threshold values) indicate movement by humans/robots/objects in the tag reader's coverage area (or read zone).

The present solution will be described below in relation to retail store applications. The present solution is not limited in this regard. The present solution can be used in any application in which an inventory needs to be determined and/or tracked.

Illustrative Inventory System

Referring now to FIG. 1, there is provided an illustration of an illustrative Retail Store Facility ("RSF") 100 implementing the present solution. The RSF 100 comprises a plurality of rooms 104, 106, 108, 110 with a hybrid LI system disposed therein. The rooms include, but are not limited to, fitting rooms, bathrooms, self-checkout areas, and/or Point of Sale ("POS") areas. The hybrid LI system comprises a plurality of networked light providers 102. The light providers 102 include, but are not limited to, light bulbs (e.g., florescent bulbs, incandescent bulbs, and/or LED bulbs) and/or light tubes (e.g., florescent tubes). The light providers 102 are configured to fit in conventional light fixtures installed on the walls, ceilings, mirrors or other structural elements of the RSF 100. The conventional light fixtures can include, but are not limited to, light sockets, emergency lighting fixtures, elevator lighting fixtures, display equipment lighting fixtures, rack lighting fixtures, floor lighting fixtures, POS lighting fixtures, and/or self-checkout kiosk lighting fixtures. The present solution is not limited in this regard, the light providers can also be designed to fit in custom or proprietary light fixtures.

The networked light providers 102 communicate with each other and/or a network control system 114 over a wireless communications network and/or a wired communications network. The wireless communications network includes, but is not limited to, a Z-wave network, a Zigbee network, and/or a Wi-Fi network. The wired communications network includes, but is not limited to, a power line network, an Ethernet network, and/or an optical network. The network control system 114 is configured to allow a person to control the on/off states of the light providers 102, as well as the intensity and/or color of light emitted from the same.

Tag readers or beacon readers are provided with the light providers 102. Tag readers and/or beacon readers are well known in the art, and therefore will not be described in detail herein. Any known or to be known tag reader or beacon reader can be used herein without limitation provided that it has a form factor which can fit inside at least a portion of a light provider structure. The tag readers can include, but are not limited to, RFID tag readers. The beacon reader can include, but is not limited to, a Bluetooth enable reader or a BLE enabled reader.

The tag readers are configured to read tags 112 within the RSF 100 continuously, periodically at pre-defined times (e.g., every N minutes or hours), and/or in response to trigger events (e.g., reception of a command from the network control system 114 when a theft event is detected in the RSF 100 and/or human motion is detected in proximity to a respective light provider). In this regard, the light providers 102 transmit RF carrier signals to the tags 112 coupled to inventory items (e.g., merchandise being offered for sale). The tags 112 respond to the RF carrier signals (or interrogator signals) with data response signals (or authentication reply signals) encoded with information stored on the tags 112. Each tag 112 may store information such as a unique identifier, and/or an EPC associated with an article or item to which it is coupled. Information read/received from the tags 112 is communicated from the light providers 102 to the network control system 114 via the wireless communications network (e.g., Wi-Fi) and/or a wired communications network (e.g., the power line network). In this way, the inventory of the RSF 100 is determined and tracked. Additionally, unauthorized movement and/or handling of the inventory items can be detected by the network control system 114 using the tag read information.

Operations of the light providers 102 are controllable based on tag read data. For example, the network control system 114 provides all of the light providers 102 with a tag's unique identifier when an alarm event or other event (e.g., a tag find request event) is detected or otherwise determined to have recently occurred. The network control system 114 may also notify each light provider 102 when a person is detected within proximity thereof by a sensor system (e.g., a camera system). In response to the notification, a light provider 102 performs tag read operations. If the light provider 102 reads a tag having the unique identifier associated with the alarm event or other event, then it will emit a flashing light at a given intensity and/or color. The light provider 102 may additionally or alternatively output an auditory alarm and/or cause the tag to output an auditory alarm. The flashing light and/or auditory alarm is discontinued by the light provider 102 after a pre-defined period of time (e.g., 1 minute) or when the tag is no longer detected by the light provider 102. In this way, the flashing light and/or auditory alarm is output from every light provider 102 where the tag is detected such that the tag's current location and/or path of travel in the RSF 100 is clearly visible to onlookers. The present solution is not limited in this regard.

The light providers 102 of the RSF 100 can also be used to detect the presence of and/or track the motion of humans, robots and/or objects in the RSF 100 in addition to or as an alternative to a camera system (not shown). In this regard, it should be understood that tags 122 include, but are not limited to, RFID tags and/or beacon enabled tags. The tags 122 may optionally comprise stationary tags strategically placed in the coverage areas (or read zones) of the light providers 102, RFID readers 116, and/or beacon reader(s) 118. The RFID reader(s) 116 and/or beacon reader(s) 118 can reside in Electronic Article Surveillance ("EAS") system pedestals (not shown) and/or other structural elements of the RSF 100 (e.g., walls, floors and/or display equipment). Changes in read information associated with these tags 112 is used to detect the presence of and/or track the motion of humans, robots and/or objects in the RSF 100, as discussed in detail below. Also, changes in the number of tag reads associated with these tags 112 is used to determine how many tags are in marginal areas and/or are not covered by read zones of the light providers 102, RFID readers 116, and/or beacon reader(s) 118. This data can be used to adjust the number of RFID readers and/or beacon readers in the RSF 100, and determine where to place additional RFID readers and/or beacon readers in the RSF 100.

The tag read information associated with these tags 112 may additionally or alternatively be used to control operations of other electronic devices in the RSF 100. For example, the tag read information is used to (a) control an on or off state of a light in or adjacent to a given tag reader's read zone, (b) control an on or off state of a display system 120 in or adjacent to a given tag reader's read zone, and/or (c) change the content (e.g., advertisements) displayed by the display system 120. The present solution is not limited to the particulars of this example.

Figure 2:
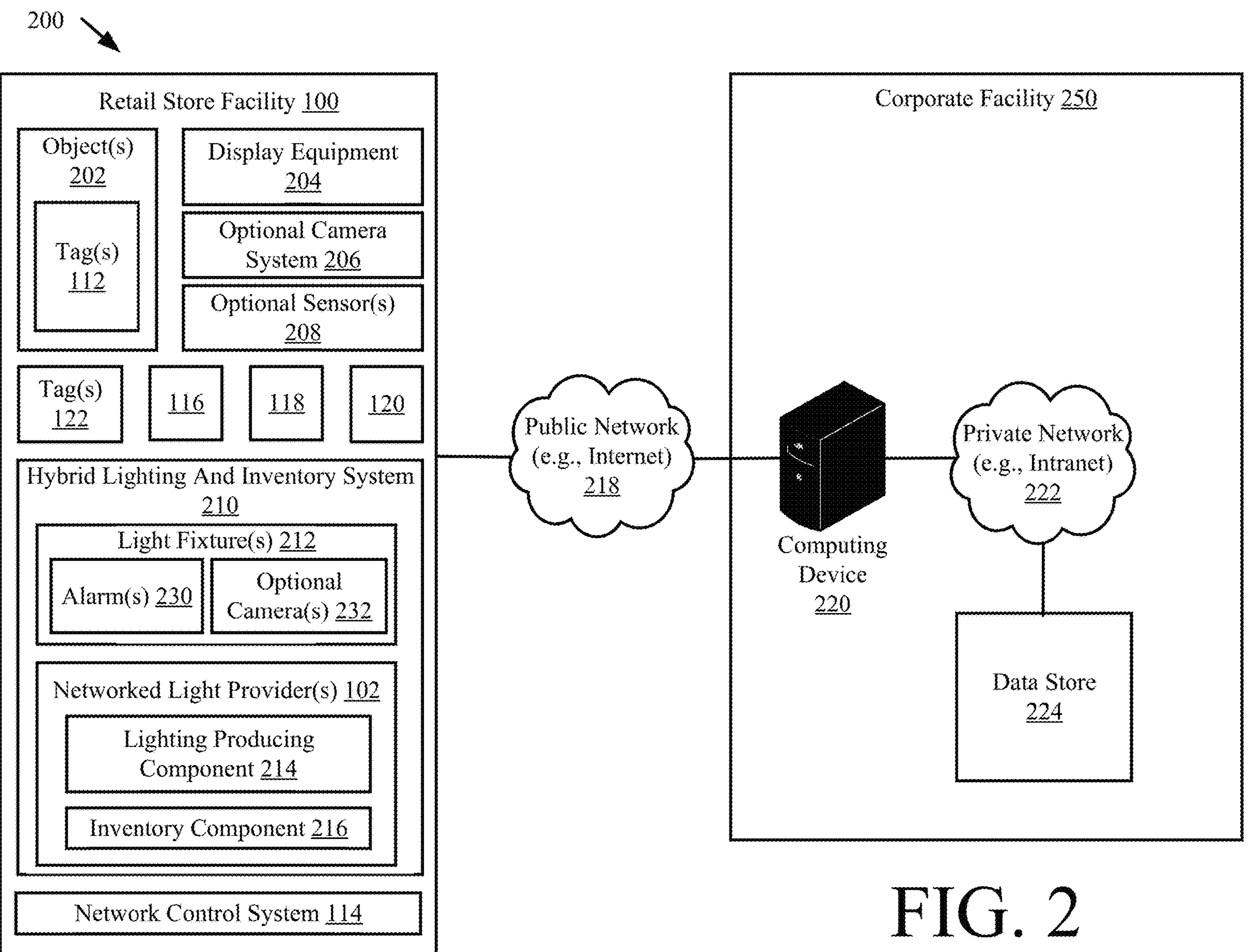
FIG. 2 is an illustration of an illustrative architecture for a system.

Referring now to FIG. 2, an illustration of an illustrative enterprise system 200 is provided. The enterprise system 200 comprises the RSF 100 and a corporate facility 250. At the RSF 100, objects 202 are offered for sale. The objects 202 can include any type of merchandise or inventory (e.g., clothing, produce, toys, electronics, etc.). The objects 202 are displayed on display equipment 204 (e.g., shelves, cabinets, tables, a rack, etc.) such that they are accessible to customers.

A camera system 206 is optionally provided to capture images and/or videos of the rooms 102-110 inside the RSF 100. The images and/or videos are stored in a data store 224 along with time stamps. The images and/or videos are analyzed by the network control system 114 and/or a computing device 220 to (a) detect people in the RSF 100, (b) track movement of the people in the RSF 100, (c) detect objects in the RSF 100, (d) track movements of the objects in the RSF 100, and/or (e) determine if a possible theft or other event is occurring.

Sensors 208 may also optionally be provided to detect the presence of people in given areas of the RSF 100. The sensors include, but are not limited to, beam break sensors and motion detection sensors. Data generated by the sensors 208 is communicated to the network control system 114 and/or computing device 220 for processing. The data is also stored in the data store 224 along with timestamps.

In some scenarios, some or all of the sensors 208 are provided along with the HLI system 210. For example, a sensor 208 is strategically placed adjacent to, near or otherwise in proximity to each light fixture 202. As noted above, the light fixtures 202 include, but are not limited to, light sockets, emergency lighting fixtures, elevator lighting fixtures, display equipment lighting fixtures, rack light fixtures, floor light fixtures, POS lighting fixtures, and/or self-checkout kiosk lighting fixtures. One or more of the light fixtures 202 may be provided with alarms 230. The alarms 230 can be visual alarms and/or auditory alarms. The alarms 230 can be issued or activated when (a) an alarm event or other event is detected or otherwise determined to be occurring or has recently occurred in the RSF 100, (b) a person is detected by the respective sensor 208 or a networked light provider, and/or (c) a tag associated with the alarm event or other event is detected in proximity to the light fixture 202.

In those or other scenarios, the camera system may be integrated with one or more of the light fixtures 212. Accordingly, the light fixtures 212 can be provided with optional cameras 232. The cameras 232 can be controlled to capture image(s) and/or video(s) when an alarm event is detected in the RSF 100 or other event is determined to be occurring or has recently occurred in the RSF 100 so as to facilitate tracking of people and/or object movement through the RSF 100. The cameras 232 can be configured such that they have Field Of Views ("FOVs") that match, are the same as or are similar to the coverage area of the tag readers provided with the networked light providers 102, respectively.

Stationary RFID readers 116 and/or beacon readers 118 can be provided to detect the presence of and/or track the motion of humans, robots and/or objects in the RSF 100 in addition to or as an alternative to a networked light providers 102, camera system 206 and/or sensors 208. Accordingly, the RFID readers 116 and/or beacon readers 118 are configured to read tags 122 in the RSF 110. Tag read information associated with the tags 122 is stored in the data store 224 along with time stamps. The tag read information includes, but is not limited to, unique identifiers for tags that were read, timestamps for the tag reads, and/or power levels of signals received by the readers 116, 118 that are associated with the tag reads. The tag read information is analyzed by the hybrid LI system 210, network control system 114 and/or a computing device 220 to (a) detect people, robots and/or objects in given areas of the RSF 100, (b) track movement of the people, robots and/or objects in the RSF 100, (c) determine if the number of networked light providers 102, RFID readers 116 and/or beacon readers 118 in the RSF 100 should be adjusted (e.g., increased or decreased), (d) determine where to place additional light providers, RFID readers and/or beacon readers in the RSF 100, and/or (e) control operations of other electronic devices in the RSF 110 (e.g., networked light provider 102 and/or display system 120).

A networked light provider 102 is coupled to one or more of the light fixtures 202. Each light provider 102 comprises a light producing component 214 and an inventory component 216. An illustration of an illustrative architecture for the networked light provider 102 is provided in FIG. 3. The networked light provider 102 is AC powered. The present solution is not limited in this regard. The networked light provider 102 could additionally or alternatively be battery powered and/or solar powered.

Figure 3:
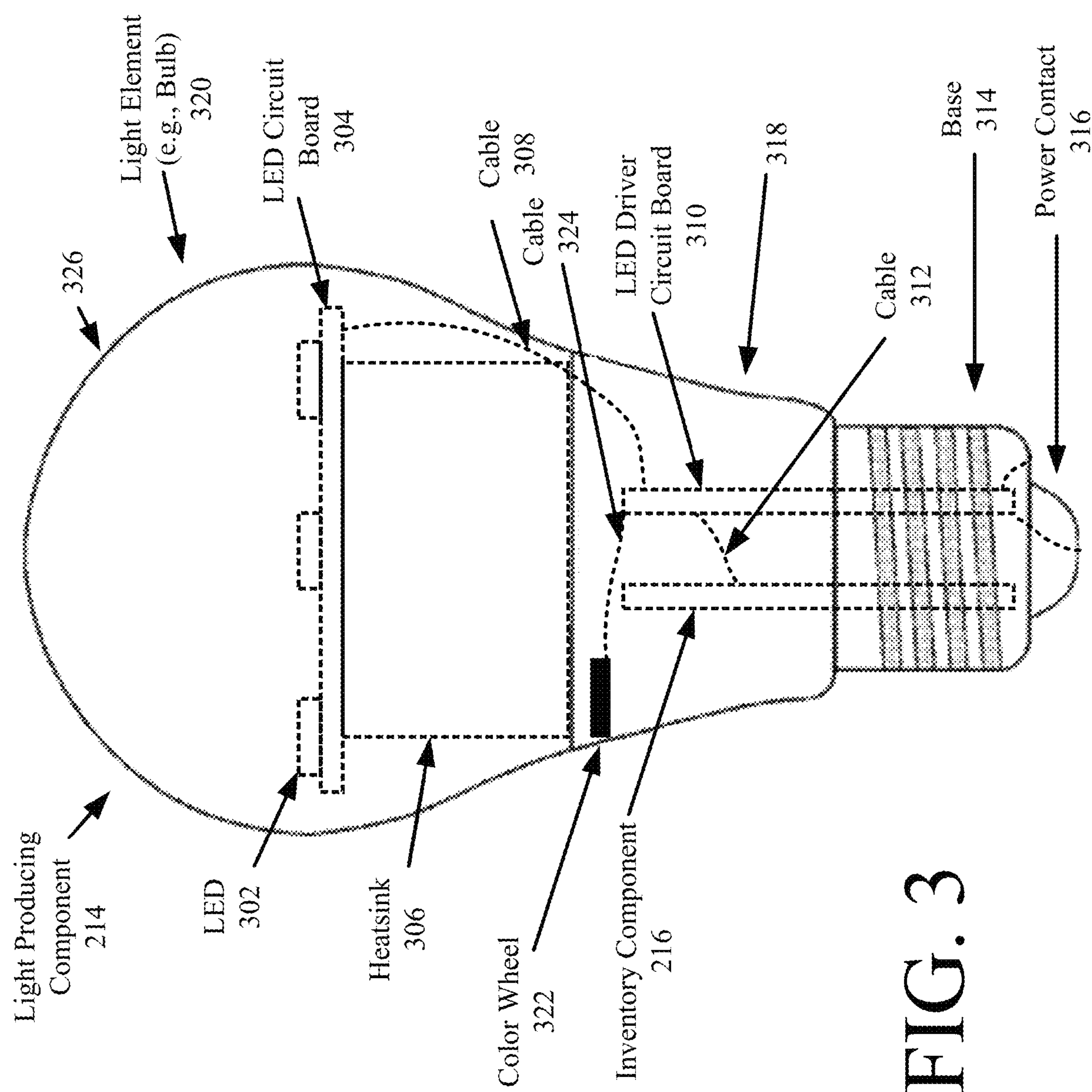
FIG. 3 is an illustration of an illustrative architecture for a networked light provider.

As shown in FIG. 3, the networked light provider 102 comprises a base 314 with a power contact 316 and a light element 320. Each portion 314, 316, 320 can be made of a single piece of material or be assembled from multiple component pieces. The base 314 and power contact 316 are collectively designed to allow the networked light provider 102 to be screwed into a standard light socket. The present solution is not limited in this regard. The base 314 and power contact 316 are collectively designed to allow the networked light provider 102 to be coupled to a customer or proprietary light socket.

The light element 320 is shown in FIG. 3 as comprising a light bulb. The present solution is not limited in this regard. The light element can alternatively comprise a light tube (e.g., a florescent tube). The light bulb and light tube can have any shape designed in accordance with a given application. For example, in some scenarios, the light bulb has a conventional bulb shape as shown in FIG. 3. In other scenarios, the light bulb has a different shape than that shown in FIG. 3 (e.g., a square shape).

The bulb 320 is at least partially transparent, and comprises an LED circuit board 304 with a plurality of Light Emitting Diodes ("LEDs") 302 coupled thereto. Traces are formed on the LED circuit board 304 for electronically connecting the LEDs 302 together in a serial or parallel fashion. In some scenarios, the LEDs 302 and LED circuit board 304 are replaced with a single multi-die LED package or a single high output LED. The LED circuit board 304 and/or the LEDs 302 may be replaceable. In this case, the bulb 320 comprises two parts 318, 326 which can be separated from each other so that part 326 can be replaced or the components 302, 304 inside part 326 can be replaced.

A heat sink 306 is provided to draw heat away from the LED circuit board 304 and/or electronic components housed inside part 318 of the light element 320. The heat sink 306 may not be needed in some applications, or could have a different configuration than that shown in FIG. 3. For example, the heat sink can be at least partially incorporated into the external shape of part 326. In this case, part 326 is transparent at a top end thereof in which the LEDs reside and opaque at a bottom end thereof adjacent to the base 314. The present solution is not limited to the particulars of this example.

Part 318 has a slot through which a color wheel 322 is accessible. A person can change or otherwise set the color of the bulb 320 by rotating the color wheel 322 in a clockwise direction and/or counter clockwise direction. The color wheel 322 is electrically connected to an LED driver circuit board 310 via a cable 324. The LED driver circuit board 310 is also electrically connected to the LED circuit board 304 via a cable 308. The LED driver circuit board 310 comprises control electronics configured to control when the LEDs 302 are turned on and off, what brightness level each of the LEDs is to operate at, and/or what color the bulb 320 is to emit at any given time in accordance with a command signal received from an external device and/or the color selected via the color wheel 322.

Figure 4:
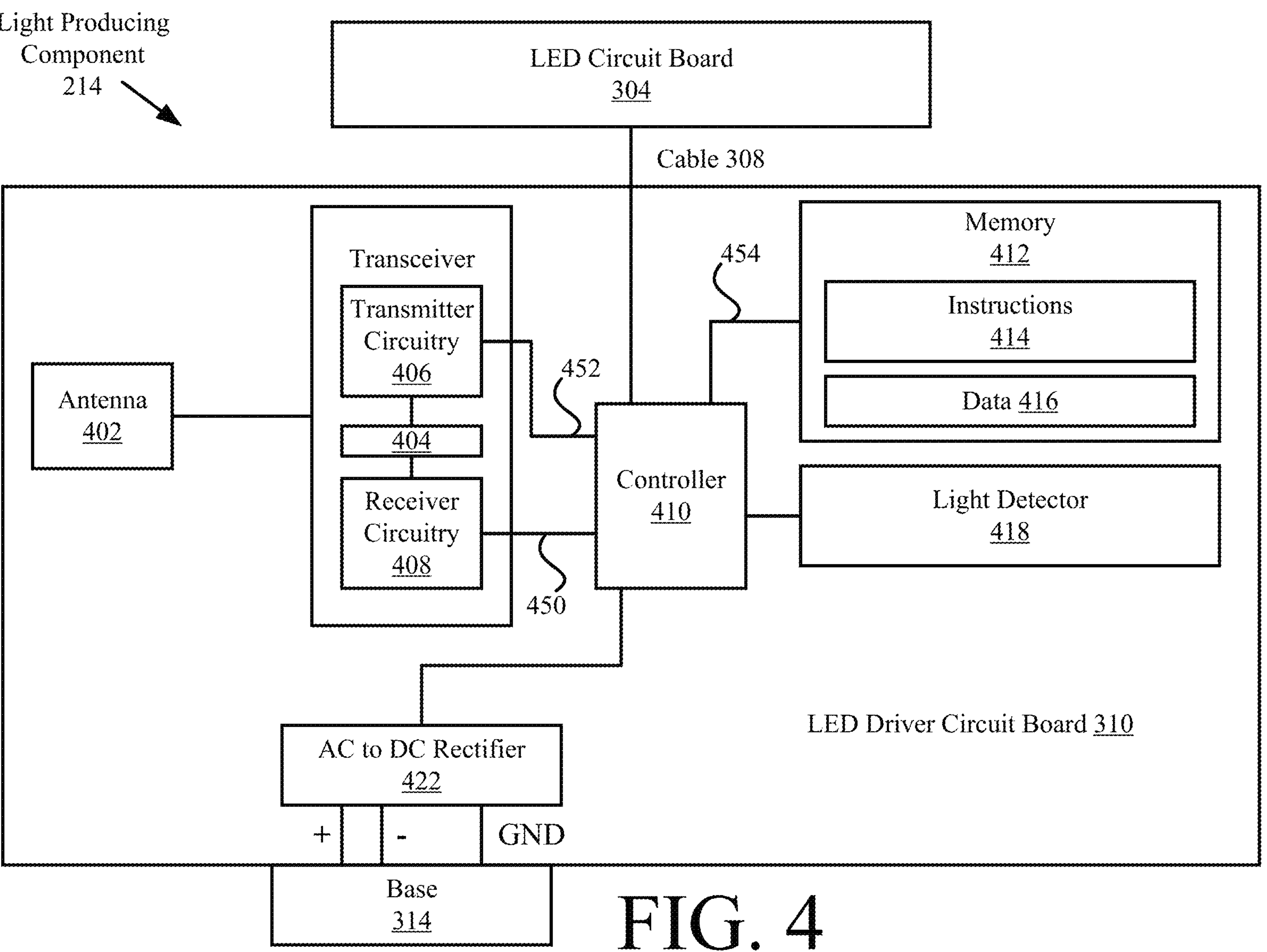
FIG. 4 is an illustration of an illustrative architecture for a light producing component of the networked light provider shown in FIG. 3.

An illustration of illustrative control electronics for the LED driver circuit board 310 is provided in FIG. 4. The LED driver circuit board 310 may include more or less components than those shown in FIG. 4. However, the components shown are sufficient to disclose an illustrative embodiment implementing the present solution. Some or all of the components of the LED driver circuit board 310 can be implemented in hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 4, the control electronics comprise an AC to DC rectifier 422. The rectifier 422 receives AC power from the base 314. The DC power produced by the rectifier 422 is used to power the control electronics 402-420. The control electronics are generally configured to wirelessly communicate with external devices (e.g., the network control system 114 of FIG. 1 and/or other networked devices). In this regard, the control electronics comprise an antenna 402 for receiving and transmitting RF signals and/or beacon signals. In some scenarios, the antenna 402 is printed on part 318 of the light producing component 214. In other scenarios, the antenna 402 is printed on the LED driver circuit board 310, or simply comprises one or more wires disposed in part 318 and coupled to the LED driver circuit board 310. The antenna 402 can include, but is not limited to, a 2D antenna or a 3D antenna.

A switch 404 selectively couples the antenna 402 to transmitter circuitry 406 and receiver circuitry 408 in a manner familiar to those skilled in the art. The receiver circuitry 408 demodulates and decodes the RF signals and/or beacon signals received from an external device. The receiver circuitry 408 is coupled to a controller (or microprocessor) 410 via an electrical connection 450. The receiver circuitry 408 provides the decoded signal information to the controller 410. The controller 410 uses the decoded RF signal information and/or beacon signal information in accordance with the function(s) of the light producing component 214. The controller 410 also provides information to the transmitter circuitry 406 for encoding and modulating information into RF signals. Accordingly, the controller 410 is coupled to the transmitter circuitry 406 via an electrical connection 452. The transmitter circuitry 406 communicates the RF signals to the antenna 402 for transmission to an external device via the switch 404.

The controller 410 is electrically connected to the LED circuit board 304 via a cable 308. The controller 410 controls the brightness level of and/or the color of light emitted from the LEDs 302 by providing a control signal to the LED circuit board 304. For example, the controller 410 may drive a control signal low to turn the LEDs 302 off, and drive a control signal high to turn the LEDs 302 on (or vice versa). In this way, the controller 410 can cause the LEDs 302 to output flashing lights. The controller 410 can control the amount of power supplied to the LEDs 302 for adjusting the brightness level of the networked light provider 102. The brightness level of the networked light provider 102 can be adjusted so that the same indicates the location of a tag in the RSF 100. For example, the brightness level of a networked light provider 102 is adjusted to be greater than or less than the brightness level of all other networked light providers when a given tag is read thereby. The present solution is not limited in this regard.

In some scenarios, the LED driver circuit board 310 is communicatively connected to the light fixture via the base 314. The LED driver circuit board 310 can optionally control operations of the LEDs 302 when a near-by camera of a camera system 206 of FIG. 2 and/or a camera 232 of the respective light fixture 212 is to capture an image or video (e.g., based on information received from the network control system 114 of FIGS. 1-2). The LED driver circuit board 310 can decrease the brightness level of the networked light provider 102 when an image/video is to be captured and/or increase the brightness level of the networked light provider 102 when the image/video has been captured. The LED driver circuit board 310 may also communicate with adjacent networked light providers to notify the same of the camera's enablement. In response to the notification, the adjacent networked light providers can increase their brightness levels for a given period of time. These brightness level adjustments result in an optimization of the quality of images/videos that are to be captured by the camera of the networked light provider 102.

The controller 410 may store received and extracted information in memory 412 of the LED driver circuit board 310. Accordingly, the memory 412 is connected to and accessible by the controller 410 through electrical connection 454. The memory 412 may be a volatile memory and/or a non-volatile memory. For example, memory 412 can include, but is not limited to, a Random Access Memory ("RAM"), a Dynamic RAM ("DRAM"), a Read Only Memory ("ROM") and a flash memory. The memory 412 may also comprise unsecure memory and/or secure memory. The memory 412 can be used to store various types of data 416 therein.

One or more sets of instructions 414 are stored in memory 412. The instructions may include customizable instructions and non-customizable instructions. The instructions 414 can also reside, completely or at least partially, within the controller 410 during execution thereof by light producing component 214. In this regard, the memory 412 and the controller 410 can constitute machine-readable media. The term "machine-readable media", as used herein, refers to a single medium or multiple media that stores one or more sets of instructions 414. The term "machine-readable media", as used here, also refers to any medium that is capable of storing, encoding or carrying the set of instructions 414 for execution by the light producing component 214 and that causes the light producing component 214 to perform one or more of the methodologies of the present disclosure.

The controller 410 is also connected to a light detector 418. The light detector 418 allows the networked light provider 102 to reflect modulated light around a room and off the floor, which can be read by other networked light providers.

Referring again to FIG. 3, an inventory component 216 is also disposed in part 318 of the bulb 320. The inventory component 216 is generally configured to detect tags in proximity to the networked light provider 102, and communicate such detections to the LED driver circuit board 310. In this regard, the inventory component 216 implements tag read technology (e.g., RFID technology and/or beacon technology). The times of tag reads performed by the tag read component 216 are selected such that heat generated by the inventory component 216 has a minimal effect on the life of the LEDs 302 or other light producing/emitting/radiating element. For example, in some scenarios, tag reads only occur during business hours when certain criteria is met. The criteria can include, but is not limited to, pre-defined times selected in accordance with given read rates, the detection of a person in proximity to the light producing component 214, and/or the recent occurrence of an event in the RSF 100. Additionally or alternatively, tag reads for inventory purposes can be performed during off-business hours when the light producing component 214 is not producing light. Techniques for detecting events in RSFs are well known in the art, and therefore will not be described in detail herein. Any known or to be known technique for detecting events can be used herein without limitation.

Figure 5:
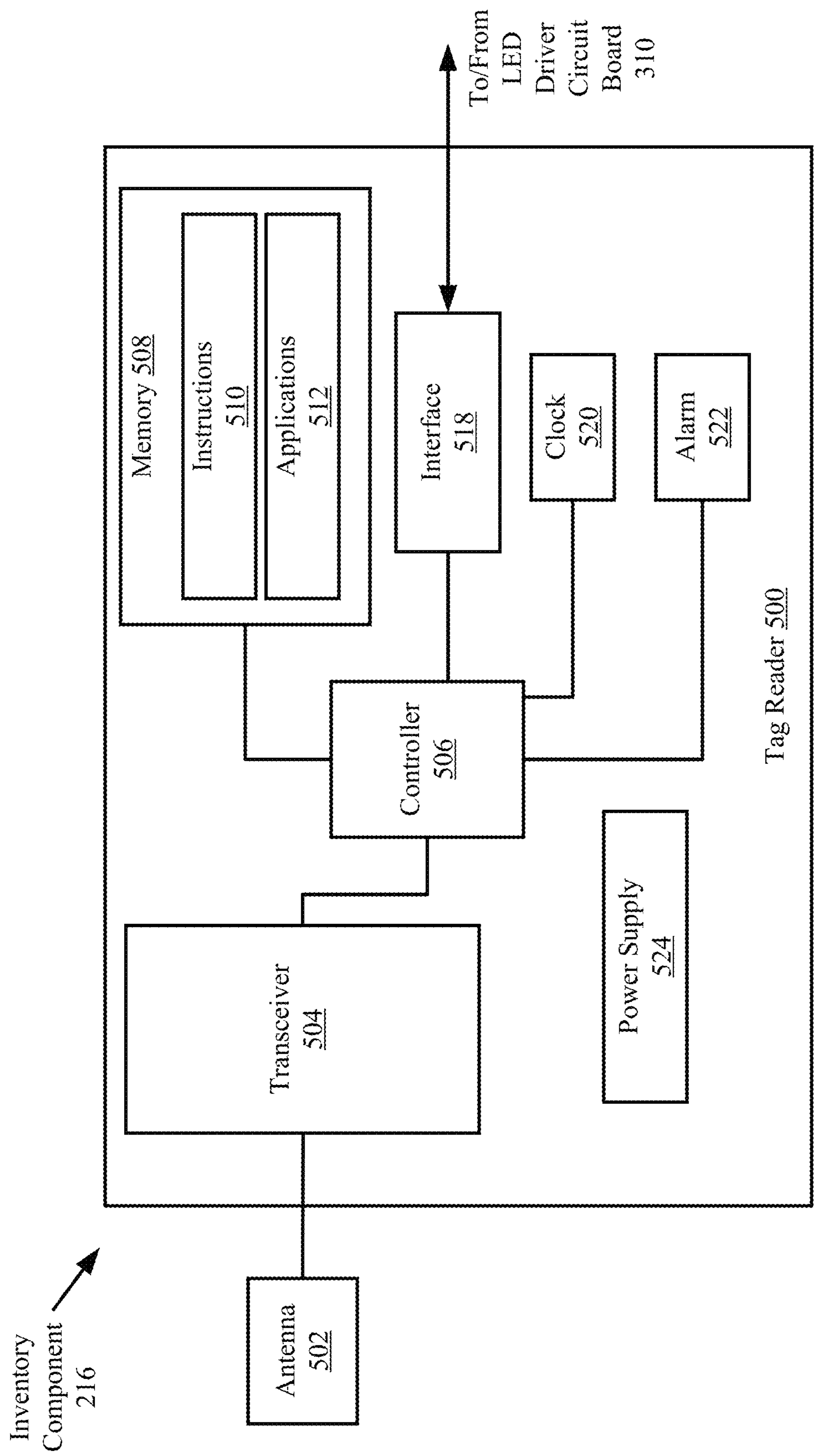
FIG. 5 is an illustration of an illustrative architecture for an inventory component of the networked light provider shown in FIG. 3.

An illustration of an illustrative architecture for the inventory component 216 is provided in FIG. 5. As shown in FIG. 5, the inventory component 216 comprises a tag reader 500. The tag reader 500 may include more or less components than that shown in FIG. 5. However, the components shown are sufficient to disclose an illustrative embodiment implementing the present solution. Some or all of the components of the tag reader 500 can be implemented in hardware, software and/or a combination of hardware and software. The hardware includes, but is not limited to, one or more electronic circuits. The electronic circuit may comprise passive components (e.g., capacitors and resistors) and active components (e.g., processors) arranged and/or programmed to implement the methods disclosed herein.

The hardware architecture of FIG. 5 represents an illustration of a representative tag reader 500 configured to facilitate improved inventory counts and management within an RSF (e.g., RSF 100 of FIG. 1). In this regard, the tag reader 500 is generally configured to allow data to be exchanged with an external device (e.g., tags 112 and/or 122 of FIGS. 1-2) via RF technology and/or beacon technology. The tag reader 500 may include a power source 524 (e.g., a battery) or be connected to the base 314 of the light producing component from which AC power is received.

The tag reader 500 comprises an antenna 402 for allowing data to be exchanged with the external device via wireless technology (e.g., RFID technology, beacon technology or other RF technology). The external device may comprise tags 112 and/or tags 122 of FIGS. 1-2. In this case, the antenna 302 is configured to transmit wireless carrier signals (e.g., interrogation signals) to the listed external devices, and/or transmit data response signals (e.g., authentication reply signals) generated by the tag reader 500. The antenna 302 is coupled to a tag reader 500. The tag reader 500 comprises a transceiver 504. Transceivers are well known in the art, and therefore will not be described herein. However, it should be understood that the transceiver 504 receives wireless signals (e.g., RF signals and/or beacon signals) including information from the transmitting device, and forwards the same to a controller 506 for extracting the information therefrom.

The extracted information can be used to determine the presence, location and/or path of travel of a tag, person, robot or object within a facility (e.g., RSF 100 of FIG. 1). Accordingly, the controller 506 can store the extracted information in memory 508, and execute software applications 512 using the extracted information. For example, the controller 506 can notify the LED driver circuit board 310 when a tag is detected by the tag reader 500. The detected tag can include, but is not limited to, an inventory tag and/or a tag with a known location in the RSF. The inventory tag can have a particular identifier associated therewith (e.g., one that is associated with a theft event or other alarm event). Other operations performed by the controller 506 will be apparent from the following discussion.

Notably, memory 508 may be a volatile memory and/or a non-volatile memory. For example, the memory 508 can include, but is not limited to, a RAM, a DRAM, an SRAM, a ROM, and a flash memory. The memory 508 may also comprise unsecure memory and/or secure memory. The phrase "unsecure memory", as used herein, refers to memory configured to store data in a plain text form. The phrase "secure memory", as used herein, refers to memory configured to store data in an encrypted form and/or memory having or being disposed in a secure or tamper-proof enclosure.

Instructions 510 are stored in memory for execution by the tag reader 500 and that cause the tag reader 500 to perform any one or more of the methodologies of the present disclosure. The instructions 510 are generally operative to facilitate determinations as to whether or not tags are present within a facility, where the tags are located within a facility, and/or whether certain tags are in motion at any given time. Other functions of the tag reader 500 will become apparent as the discussion progresses.

Figure 6:
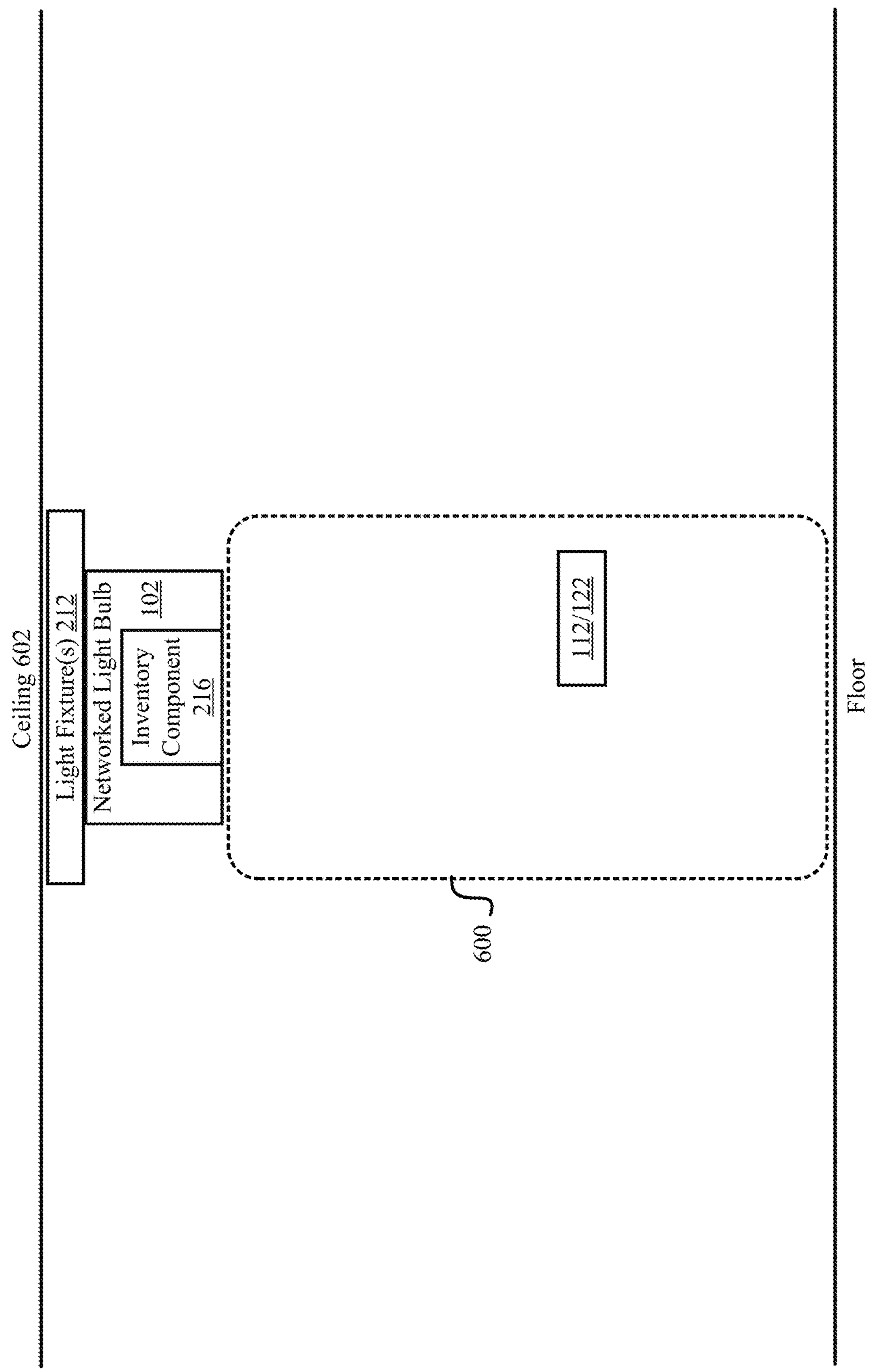
FIG. 6 is an illustration that is useful for understanding operations of the inventory component shown in FIG. 5.

Referring now to FIG. 6, there is provided an illustration that is useful for understanding operations of the inventory component 216. During operations, the inventory component 216 detects the presence of an active tag 112, 122 when the same is read by the tag reader 500 in its coverage area. The antenna 502 is suitable for aiding in the detection of the tags, as described herein. In this regard, the antenna 502 is suitable for: (a) transmitting or producing interrogation signals and receiving response signals generated by RFID enabled tags in the tag reader's coverage area; and/or (b) receiving beacon signals emitted from beacon enabled tags. The tag reader's coverage area defines the detection zone 600. In some scenarios, the detection zone 600 is provided under a respective networked light provider 102 coupled to a light fixture disposed in the ceiling 602 of the RSF 100. In response to the detection of the tag, the tag reader 500 sounds an alarm, performs operations to cause a light fixture 212 and/or networked light provider 102 to sound an alarm, performs operations to cause the networked light provider 102 to emit light with certain characteristics (e.g., brightness, color, continuous and/or flashing), and/or cause the control of operations by other electronic equipment (e.g., a camera system 206 of FIG. 2 and/or display system 120 of FIGS. 1-2) adjacent to or in proximity with (e.g., within 1-30 feet of the networked light provider 102). Accordingly, the networked light provider 102 is arranged for detecting articles for inventory purposes, detecting the presence of humans/robots/objects in a given area, tracking movement of the humans/robots/objects in the given area, facilitating the prevention of an unauthorized removal of articles or products from controlled areas, and/or facilitating an improved customer experience and/or conversion rate for articles or products.

Figure 7:
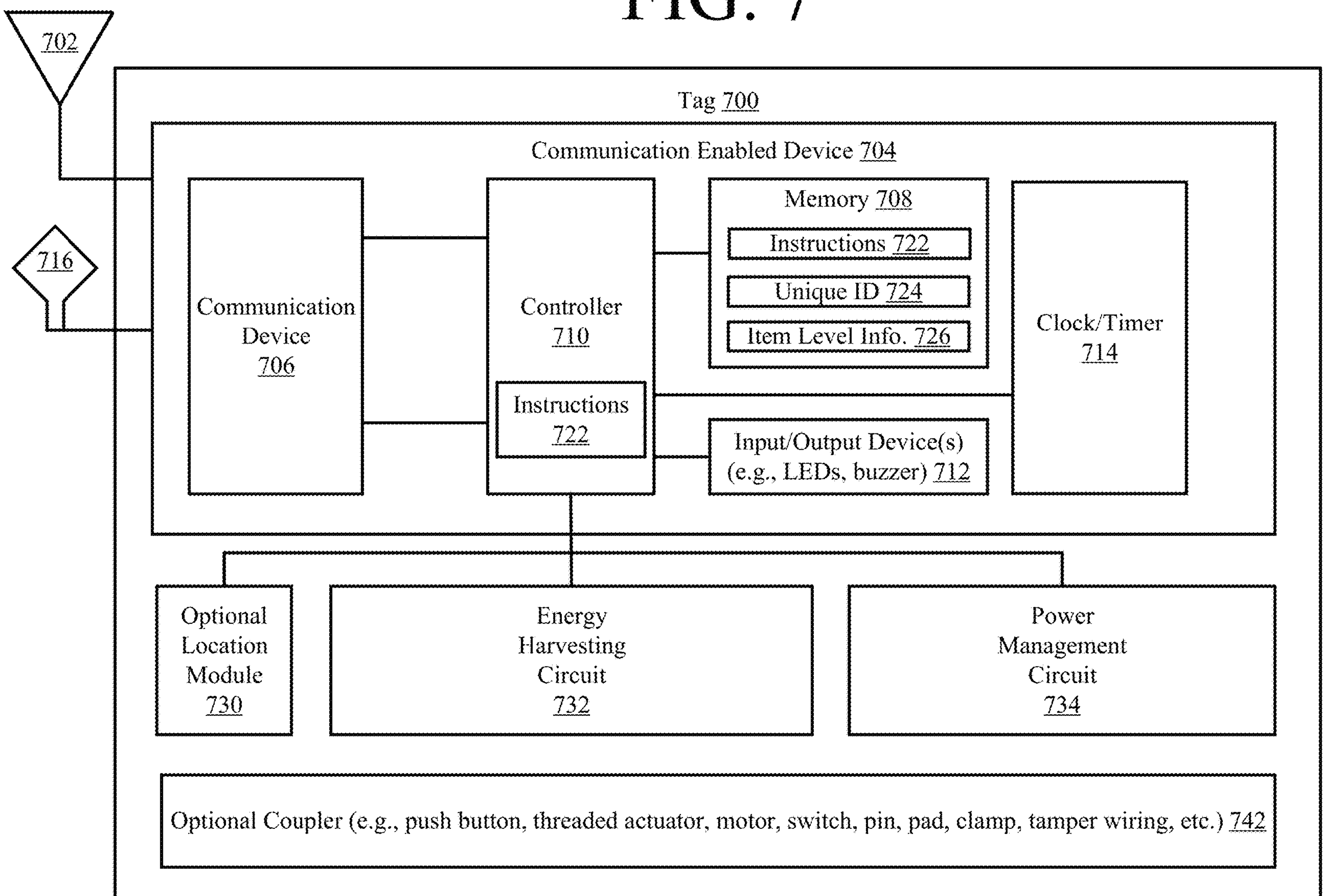
FIG. 7 is an illustration of an illustrative architecture for a tag.

Referring now to FIG. 7, there is provided an illustration of an illustrative architecture for a tag 700. Tags 112, 120 of FIGS. 1-2 can be the same as or similar to tag 700. As such, the discussion of tag 700 is sufficient for understanding tags 112, 120.

Tag 700 can include more or less components than that shown in FIG. 7. However, the components shown are sufficient to disclose an illustrative embodiment implementing the present solution. Some or all of the components of the tag 700 can be implemented in hardware, software and/or a combination of hardware and software. The hardware includes, but is not limited to, one or more electronic circuits. The electronic circuit(s) may comprise passive components (e.g., capacitors and resistors) and active components (e.g., processors) arranged and/or programmed to implement the methods disclosed herein.

The hardware architecture of FIG. 7 represents a representative tag 700 configured to facilitate improved inventory management, human/robot/object movement detection/tracking, traffic analytics, customer experience, and/or product conversion rates. In this regard, the tag 700 is configured for allowing data to be exchanged with an external device (e.g., inventory component 216 of FIGS. 2 and 5) via wireless communication technology. The wireless communication technology can include, but is not limited to, RFID technology, a Near Field Communication ("NFC") technology, a Short Range Communication ("SRC") technology, and/or beacon technology. For example, one or more of the following wireless communication technologies (is)are employed Radio Frequency ("RF") communication technology, Bluetooth technology, WiFi technology, and/or a beacon communication technology. Each of the listed wireless communication technologies is well known in the art, and therefore will not be described in detail herein. Any known or to be known wireless communication technology or other wireless communication technology can be used herein without limitation.

The components 706-714 shown in FIG. 7 may be collectively referred to herein as a communication enabled device 704, and include a memory 708 and a clock/timer 714. Memory 708 may be a volatile memory and/or a non-volatile memory. For example, the memory 708 can include, but is not limited to, Random Access Memory ("RAM"), Dynamic RAM ("DRAM"), Static RAM ("SRAM"), Read Only Memory ("ROM") and flash memory. The memory 708 may also comprise unsecure memory and/or secure memory.

In some scenarios, the communication enabled device 704 comprises a Software Defined Radio ("SDR"). SDRs are well known in the art, and therefore will not be described in detail herein. However, it should be noted that the SDR can be programmatically assigned any communication protocol that is chosen by a user (e.g., RFID, WiFi, LiFi, Bluetooth, BLE, Nest, ZWave, Zigbee, etc.). The communication protocols are part of the device's firmware and reside in memory 708. Notably, the communication protocols can be downloaded to the device at any given time. The initial/default role (being an RFID, WiFi, LiFi, etc. tag) can be assigned at the deployment thereof. If the user desires to use another protocol at a later time, the user can remotely change the communication protocol of the deployed tag 112. The update of the firmware, in case of issues, can also be performed remotely.

As shown in FIG. 7, the communication enabled device 704 comprises at least one antenna 702, 716 for allowing data to be exchanged with the external device via a wireless communication technology (e.g., an RFID technology, an NFC technology, a SRC technology, and/or beacon technology). The antenna 702, 716 is configured to receive signals from the external device and/or transmit signals generated by the communication enabled device 704. The antenna 702, 716 can comprise a near-field or far-field antenna. The antennas include, but are not limited to, a chip antenna or a loop antenna.

The communication enabled device 704 also comprises a communication device (e.g., a transceiver or transmitter) 706. Communication devices (e.g., transceivers or transmitters) are well known in the art, and therefore will not be described herein. However, it should be understood that the communication device 706 generates and transmits signals (e.g., RF carrier signals) to external devices, as well as receives signals (e.g., RF signals and/or beacon signals) transmitted or emitted from external devices. In this way, the communication enabled device 704 facilitates the registration, identification, location and/or tracking of an item (e.g., object 202 of FIG. 2) to which the tag 700 is coupled.

The communication enabled device 704 facilitates the automatic and dynamic modification of item level information 726 that is being or is to be output from the tag 700 in response to certain trigger events. The trigger events can include, but are not limited to, the tag's arrival at a particular facility (e.g., RSF 100 of FIG. 1), the tag's arrival in a particular country or geographic region, a date occurrence, a time occurrence, a price change, and/or the reception of user instructions.

Item level information 726 and a unique identifier ("ID") 724 for the tag 700 (e.g., an EPC) can be stored in memory 708 of the communication enabled device 704 and/or communicated to other external devices (e.g., tag reader 500 of FIG. 5) via communication device (e.g., transceiver) 706. For example, the communication enabled device 704 can communicate information specifying a timestamp, a unique identifier for an item, item description, item price, a currency symbol and/or location information to an external device. The external device can then store the information in a database (e.g., memory 508 of FIG. 5 and/or data store 224 of FIG. 2) and/or use the information for various purposes.

The communication enabled device 704 also comprises a controller 710 (e.g., a CPU) and input/output devices 712. The controller 710 can execute instructions 722 implementing methods for facilitating inventory counts and management. In this regard, the controller 710 includes a processor (or logic circuitry that responds to instructions) and the memory 708 includes a computer-readable storage medium on which is stored one or more sets of instructions 722 (e.g., software code) configured to implement one or more of the methodologies, procedures, or functions described herein. The instructions 722 can also reside, completely or at least partially, within the controller 710 during execution thereof by the tag 700. The memory 708 and the controller 710 also can constitute machine-readable media. The term "machine-readable media", as used here, refers to a single medium or multiple media (e.g., a centralized or distributed database, and/or associated caches and servers) that store the one or more sets of instructions 722. The term "machine-readable media", as used here, also refers to any medium that is capable of storing, encoding or carrying a set of instructions 722 for execution by the tag 700 and that cause the tag 700 to perform any one or more of the methodologies of the present disclosure.

The input/output devices can include, but are not limited to, a display (e.g., an E Ink display, an LCD display and/or an active matrix display), a speaker, a keypad and/or light emitting diodes. The display is used to present item level information in a textual format and/or graphical format. Similarly, the speaker may be used to output item level information in an auditory format. The speaker and/or light emitting diodes may be used to output alerts for drawing a person's attention to the tag 700 (e.g., when an alert condition exists) and/or for notifying the person of a particular pricing status (e.g., on sale status) of the item to which the tag is coupled.

The clock/timer 714 is configured to determine a date, a time, and/or an expiration of a pre-defined period of time. Technique for determining these listed items are well known in the art, and therefore will not be described herein. Any known or to be known technique for determining these listed items can be used herein without limitation.

The tag 700 also comprises an optional location module 730. The location module 730 is generally configured to determine the geographic location of the tag at any given time. For example, in some scenarios, the location module 730 employs Global Positioning System ("GPS") technology and/or Internet based local time acquisition technology. The present solution is not limited to the particulars of this example. Any known or to be known technique for determining a geographic location can be used herein without limitation including relative positioning within a facility or structure.

The optional coupler 742 is provided to securely or removably couple the tag 700 to an item (e.g., object 202 of FIG. 2). The coupler 742 includes, but is not limited to, a mechanical coupling means (e.g., a strap, clip, clamp, snap) and/or adhesive (e.g., glue or sticker). The coupler 742 is optional since the coupling can be achieved via a weld and/or chemical bond.

The tag 700 can also include an energy harvesting circuit 732 for ensuring continuous operation of the tag 700 without the need to change a rechargeable power source (e.g., a battery). In some scenarios, the energy harvesting circuit 732 is configured to harvest energy from one or more sources (e.g., heat, light, vibration, magnetic field, and/or RF energy) and to generate a relatively low amount of output power from the harvested energy. By employing multiple sources for harvesting, the device can continue to charge despite the depletion of a source of energy. Energy harvesting circuits are well known in the art, and therefore will not be described herein. Any known or to be known energy harvesting circuit can be used herein without limitation.

A power management circuit 734 is provided for controlling the supply of power to components of the tag 700. In the event all of the storage and harvesting resources deplete to a point where the tag 700 is about to enter a shutdown/brownout state, the power management circuit 734 can cause an alert to be sent from the tag 700 to a remote device. The remote device can include a tag reader 500 of a networked light provider 102 of FIG. 1. In response to the alert, the tag reader 500 can transmit RF signals for charging an energy storage device (e.g., a capacitor) of the energy harvesting circuit 732. Additionally or alternatively, the networked light provider 102 can turn on and/or increase an intensity of light emitted therefrom for charging the energy storage device (e.g., a capacitor) of the energy harvesting circuit 732. In some scenarios, the energy storage devices of tags 700 are only charged during off hours or when no humans are detected within proximity of the networked light provider 102.

Figure 8:
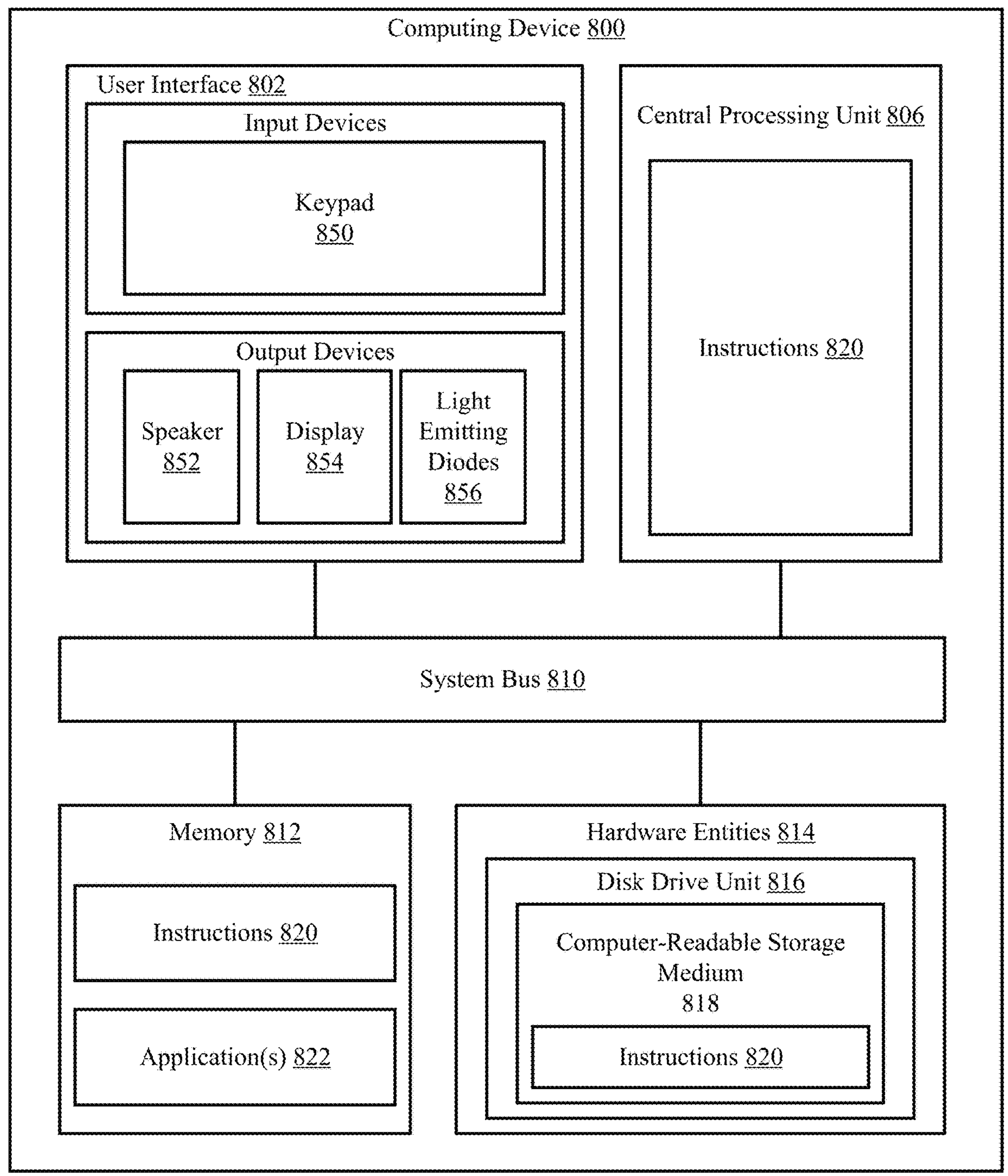
FIG. 8 is an illustration of an illustrative architecture for a computing device.

Referring now to FIG. 8, there is provided a detailed block diagram of an illustrative architecture for a computing device 800. The network control system 112 of FIGS. 1-2 and/or the computing device 220 of FIG. 2 is/are the same as or substantially similar to computing device 800. As such, the following discussion of computing device 800 is sufficient for understanding computing device 800.

Notably, the computing device 800 may include more or less components than those shown in FIG. 8. However, the components shown are sufficient to disclose an illustrative embodiment implementing the present solution. The hardware architecture of FIG. 8 represents one embodiment of a representative computing device configured to facilitate an improved inventory process. As such, the computing device 800 of FIG. 8 implements at least a portion of the methods described herein.

Some or all the components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a Central Processing Unit ("CPU") 806, a system bus 810, a memory 812 connected to and accessible by other portions of computing device 800 through system bus 810, and hardware entities 814 connected to system bus 810. The user interface can include input devices (e.g., a keypad 850) and output devices (e.g., speaker 852, a display 854, and/or light emitting diodes 856), which facilitate user-software interactions for controlling operations of the computing device 800.

At least some of the hardware entities 814 perform actions involving access to and use of memory 812, which can be a RAM, a disk driver and/or a Compact Disc Read Only Memory ("CD-ROM"). Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

In some scenarios, the hardware entities 814 include an electronic circuit (e.g., a processor) programmed for facilitating the determination of an inventory within a facility, the determination of tag locations within the facility, the provision of a three dimensional map showing locations of tags within the facility, the detection of alert events, and/or the control of a hybrid LI system. In this regard, it should be understood that the electronic circuit can access and run application(s) 822 installed on the computing device 800. The software application(s) 822 is(are) generally operative to facilitate the determination of an inventory within a facility, the determination of tag locations within the facility, the mapping of the tag locations in a virtual three dimensional space, the detection of alert events, and/or the control of a hybrid LI system. The software application(s) 822 is(are) also operative to use product identification codes (e.g., tag SKU information) to group tags into product (e.g., SKU) areas; determine generic human readable names for the product (e.g., SKU) areas; and add visual lines and/or text to the map for visually showing product (e.g., SKU) areas. Other functions of the software application(s) 822 will become apparent as the discussion progresses.

Illustrative Method for Determining Inventory and/or Detecting Motion

Figure 9:
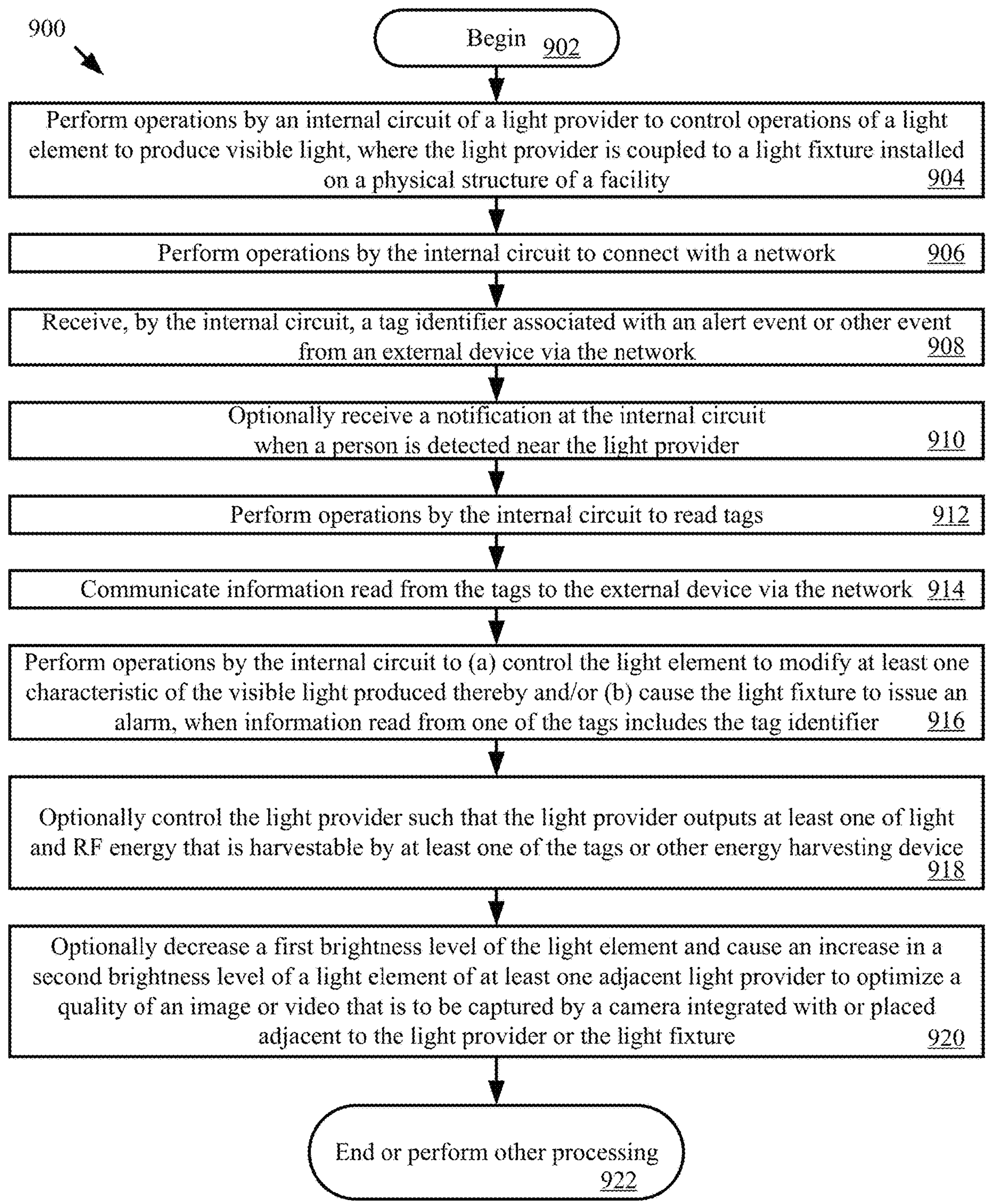
FIG. 9 is a flow diagram of an illustrative method for determining an inventory.

Referring now to FIG. 9, there is provided a flow diagram of an illustrative method 900 for determining an inventory using a hybrid LI system. As shown in FIG. 9, method 900 comprises a plurality of operations 904-920. The present solution is not limited to the order in which the operations are presented in FIG. 9. The operations can be performed in an order different than that shown in FIG. 9.

Method 900 begins with 902 and continues with 904 where an internal circuit (e.g., LED driver circuit 310 and/or inventory component 216 of FIGS. 3-5) of a light provider (e.g., light provider 102 of FIGS. 1-2) controls operations of a light element (e.g., light element 320 of FIG. 3) to produce visible light. The light provider is coupled to a light fixture (e.g., light fixture 212 of FIG. 2) installed on a physical structure of a facility (e.g., RSF 100 of FIGS. 1-2).

In 906, the internal circuit connects to a network. Thereafter in 908, the internal circuit receives a tag identifier associated with an alert event or other event from an external device (e.g., the network control system 114 of FIGS. 1-2 and/or computing device 220 of FIG. 2). The alert event may include possible theft of an object (e.g., object 202 of FIG. 2) to which a tag (e.g., tag 112 of FIGS. 1-2 and 7) is coupled. The other event can include, but is not limited to, a tag find request event. The internal circuit may also optionally receive a notification when a person is detected near the light provider, as shown by 910. This detection of the person can be made using images/videos captured by a camera system (e.g., camera system 206 and/or 232 of FIG. 2), sensor data generated by sensors (e.g., sensors 208 of FIG. 2) located near the light provider, and/or tag read information from reading tags (e.g., tag 122 of FIGS. 1-2 and 7).

In 912, the internal circuit performs operations to read tags. Information read from the tags is communicated from the light provider to the external device via the network in 914. This information received from each read tag is processed by the internal circuit to determine if it includes the unique identifier associated with the alert event or other event. If so, the internal circuit (a) controls the light element to modify at least one characteristic of the visible light (e.g., on/off state, brightness level, continuous to flashing, and/or color) produced thereby and/or (b) causes the light fixture to issue or enable an alarm (e.g., alarm 230 of FIG. 2), as shown by 916. The alarm may be an auditory alarm (e.g., a siren or sequential beeps) or a visual alarm (e.g., a colored flashing light).

In 918, the light provider is optionally controlled by the internal circuit such that the light provider outputs at least one of light and RF energy that is harvestable by at least one of the tags or other energy harvesting device. In optional 920, the internal circuit performs operations to decrease a first brightness level of the light element and cause an increase in a second brightness level of a light element of at least one adjacent light provider to optimize a quality of an image or video that is to be captured by a camera (e.g., camera 232 of FIG. 2) integrated with the light fixture or a camera (e.g., camera system 206 of FIG. 2) placed in proximity to the light fixture. Subsequently, 922 is performed where method 900 ends or other processing is performed (e.g., the light provider is turned off and/or method 900 returns to 902).

Referring now to FIG. 10, there is provided a flow diagram of an illustrative method 1000 for detecting the presence of and/or tracking movement of a person, robot or object in a given area of a facility (e.g., RSF 100 of FIGS. 1-2). As shown in FIG. 10, method 1000 comprises a plurality of operations 1004-1030. The present solution is not limited to the order in which the operations are presented in FIG. 10. The operations can be performed in an order different than that shown in FIG. 10.

Method 1000 begins with 1002 and continues with 1004 where first operations are performed to read a plurality of tags (e.g., tags 120 of FIGS. 1-2 and 7) in a facility (e.g., RSF 100 of FIGS. 1-2). The first operations are performed by an inventory component (e.g., inventory component 216 of FIG. 2) of one or more network light providers (e.g., network light providers 102 of FIGS. 1-2), RFID reader(s) (e.g., RFID readers 116 of FIGS. 1-2), and/or beacon reader(s) (e.g., beacon readers 118 of FIGS. 1-2). The tags have unique identifiers associated therewith. The unique identifiers are stored in a data store (e.g., data store 224 of FIG. 2). First tag read information is also stored in the data store, as shown by 1006. The first tag read information includes, but is not limited to, unique identifiers for tags that were read in 1004, timestamps for the tag reads in 1004, a frequency used to read the tags in 1004, and/or power levels of received signals associated with the tag reads of 1004.

Next in 1008, second operations are performed to read the tags once again. The second operations can be the same as or similar to the first operations of 1004. Second tag read information is stored in the data store, as shown by 1010. The second tag read information includes, but is not limited to, unique identifiers for tags that were read in 1008, timestamps for the tag reads in 1008, a frequency used to read the tags in 1008, and/or power levels of received signals associated with the tag reads of 1008. The frequency used in 1004 and 1008 may be the same or different.

In 1012, the second tag read information is compared to the first tag read information to determine if there is a change in which tags were read in 1008 as compared to which tags were read in 1004 and/or if there is a change in the power level of received signals (such as a reduction) associated with any given tag read in both 1004 and 1008. This comparison can be performed by a network control system (e.g., network control system 114 of FIGS. 1-2) and/or a computing device (e.g., computing device 220 of FIG. 2). If not [1014:NO], then 1016 is performed where method 1000 ends or other processing is performed.

If so [1014:YES], then method 1000 continues with 1018 where a conclusion is made (e.g., by a network control system 114 of FIGS. 1-2) that a person, robot or object is present in a given area of the facility (e.g., a coverage area or read zone of a particular network light provider, RFID reader, and/or beacon reader). Such a conclusion can optionally cause an internal circuit of a networked light provider to be notified that a person, robot or object has been detected in the given area of the facility, as shown by optional 1020. This notification can be sent from the network control system to an internal circuit of the network light provider.

In 1022, third operations are performed to read the tags once again. The third operations can be the same as or similar to the first operations of 1004 and/or the second operations of 1008. Third tag read information is stored in the data store, as shown by 1024. The third tag read information includes, but is not limited to, unique identifiers for tags that were read in 1022, timestamps for the tag reads in 1022, frequencies used to read the tags, and/or power levels of received signals associated with the tag reads of 1022.

The first, second and/or third tag read information is used in 1026 to determine movement of the person, robot or object in the given area. For example, if a first tag is read in 1004 but is not read in 1008 and a second tag is read in 1004 and 1008 but not in 1022, then a determination is made that the person, robot or object moved from being in proximity to (e.g., within 5 feet of) the first tag to being in proximity to (e.g., within 5 feet of) the second tag. Similarly, if the power level of signals received from the first tag's read is reduced in 1008 and the power level of signals received from the second tag's read is reduced in 1022, then a determination is made that the person, robot or object moved from being in proximity to (e.g., within 5 feet of) the first tag to being in proximity to (e.g., within 5 feet of) the second tag. The present solution is not limited to the particulars of these examples. Movement information is stored in the data store as shown by 1028. The movement information specifies the person's movement, robot's movement, or object's movement.

In 1030, the first information, second information, third information and/or movement information is used to perform a traffic analysis, control operations of other electronic devices, facilitate an adjustment of the number and/or placement of RFID readers and/or beacon readers in the facility. For example, the information is used to determine the total number of people, robots and/or objects in a given area during a particular period of time. Additionally or alternatively, the information is used to trigger an operational state change of (1) an RFID reader in an adjacent area of the facility, (2) a beacon reader in an adjacent area of the facility, (3) a networked light provider in the given area and/or an adjacent area of the facility, and/or (4) a display system in the given area and/or an adjacent area of the facility. The operational state change can include, but is not limited to, enabling an RFID tag read, enabling a beacon read, turning on a light, turning off a light, turning on a display system, turning off a display system, and/or changing content being displayed on a display system. The content can be changed based on the detected movement of the person which indicates which products the person has an interest in (e.g., if a person moved in proximity to a particular tag located adjacent to products of a particular type (e.g., diapers) and remained in proximity to the products for a period of time that exceeds a threshold value, then the displayed content is changed to advertise the same products or other products which are related to the same products and/or can be used in conjunction with the same products (e.g., diaper cream or wipes)). Upon completing 1030, 1032 is performed where method 1000 ends or other processing is performed (e.g., return to 1002).

Referring now to FIG. 11, there is provided a flow diagram of an illustrative method 1100 for detecting a presence of a person, robot or object in a given area (a) without use of a camera system and/or (b) using a hybrid LI system. As shown in FIG. 11, method 1100 comprises a plurality of operations 1104-1124. The present solution is not limited to the order in which the operations are presented in FIG. 11. The operations can be performed in an order different than that shown in FIG. 11.

The method 1100 begins with 1102 and continues with 1104. 1104 involves maintaining a data store (e.g., data store 224 of FIG. 2) of identifiers for first tags (e.g., tags 122 of FIGS. 1-2) that are readable by an internal circuit (e.g., inventory component 216 of FIG. 2) of at least one light provider (e.g., light provider 102 of FIGS. 1-2). In some scenarios, the first tags include inventory tags with variable locations in the facility. In other scenarios, the first tags include reference tags that have been strategically placed in the facility, and therefore have static known locations in a facility (e.g., RSF 100 of FIGS. 1-2). The light provider is coupled to a light fixture (e.g., light fixture 212 of FIG. 2) installed on a physical structure of the facility.

1106-1108 involve: tracking (a) changes in which of the first tags are read by the at least one light provider's internal circuit during consecutive tag read processes and (b) changes in power levels of tag read signals received at the light provider during the consecutive tag read processes; and using the tracked information (a) and (b) to detect the presence of the person, robot or object in the given area.

In 1110, the tracked information is also used to detect and track movement of the person, robot or object in the given area. Notably, in some scenarios, different frequencies are used to read tags. For example, the first tags are read using a first signal frequency during a first tag read process, and read using a second signal frequency during a second tag read process. These first and second frequencies may be used to facilitate the detection and tracking of the movement.

In optional 1112, the tracked information (a) and (b) is used to make a prediction that a theft is occurring. Such a prediction can be made when the tracked information indicates that the person did not visit a POS station or otherwise successfully purchase an item prior to traveling towards or into proximity to (e.g., within 10 feet of) an entryway of the facility.

In 1114, the tracked information is used to perform a traffic analysis. The traffic analysis can involve counting the number of people/robots/objects that are detected in a given area over a period of time, determining movements of the people/robots/objects through the given area, determining if any of the movements are common to the people/robots/objects, determining patterns of movements of the people/robots/objects through the given area, and/or determining if any of the movement patterns match a reference movement pattern by a certain degree (e.g., >50%).

In optional 1116-1118, the following operations are performed by the internal circuit (e.g., light producing component 214 of FIG. 2) of the at least one light provider: control operations of a light element (e.g., light element 320 of FIG. 3) to produce visible light; connect with a network (e.g., network 218 of FIG. 2); receive a tag identifier from at least one external device (e.g., computing device 220 of FIG. 2) via the network; and control the light element to modify at least one characteristic of the visible light produced thereby when (1) the presence of the person is detected by the at least one light provider in the given area and (2) information read from a second tag includes the tag identifier.

In optional 1120-1124, the tracked information is used to: trigger certain operations of other electronic devices (e.g., a tag reader 116 of FIGS. 1-2, a light 102 of FIGS. 1-2, and a display 120 of FIGS. 1-2) in the given area or an adjacent area; change content displayed on a display screen in proximity to the tag reader (e.g., an RFID reader or a beacon reader); and adjust a total number of tag readers in the facility (e.g., networked light providers 102, RFID readers 116 and/or beacon readers 118 of FIGS. 1-2) or a location of a tag reader in the facility based on the tracked information. Subsequently, 1126 is performed where method 1100 ends or other processing is performed.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

What is claimed is:

1. A method for detecting a moving object, comprising:

maintaining a data store of identifiers for first tags, the first tags readable by an internal circuit of at least one light provider and not coupled to the moving object over sequential tag reads by the internal circuit, where each at least one light provider is coupled to a light fixture installed on a physical structure of a facility;

reading the first tags using a first signal frequency during a first tag read process;

reading the first tags using a second signal frequency during a second tag read process;

tracking changes in power levels of tag read signals of individual first tags received at each at least one light provider between the first tag read process and the second tag read process;

using the changes in the power levels to detect an object moving in a read area of the internal circuit; and performing operations by the internal circuit of the at least one light provider to:

control operations of a light element to produce visible light;

connect with a network;

receive a tag identifier from at least one external device via the network; and control the light element to modify at least one characteristic of the visible light produced thereby when (1) a presence of the object is detected by the at least one light provider in a given area and (2) information read from a second tag includes the tag identifier.

2. A system, comprising:

a data store having stored therein identifiers for first tags, not coupled to a moving object over sequential tag reads by an internal circuit;

at least one light provider coupled to a light fixture installed on a physical structure of a facility, and comprising the internal circuit configured to read the first tags in a read area; and a computing device configured to:

read the first tags using a first signal frequency during a first tag read process;

read the first tags using a second signal frequency during a second tag read process;

track changes in power levels of tag read signals of individual first tags received at each at least one light provider between the first tag read process and the second tag read process; and use the changes in the power levels to detect an object moving in the read area of the internal circuit; and wherein the internal circuit of the at least one light provider is configured to:

perform operations to control operations of a light element to produce visible light;

connect with a network;

receive a tag identifier from at least one external device via the network; and control the light element to modify at least one characteristic of the visible light produced thereby when (1) a presence of the object is detected by the at least one light provider in the read area and (2) information read from a second tag includes the tag identifier.

3. The method according to claim 1, wherein the first tags have known locations in the facility.

4. The method according to claim 1, further comprising predicting that a theft is occurring based on detected and tracked movement.

5. The method according to claim 1, further comprising performing a traffic analysis using the changes in the power levels.

6. The method according to claim 1, further comprising using the changes to trigger certain operations of electronic devices in the read area or an adjacent area.

7. The method according to claim 6, wherein the electronic devices comprise at least one of a tag reader, a light, and a display.

8. The method according to claim 1, further comprising changing content displayed on a display screen in proximity to the at least one light provider based on the changes in the power levels.

9. The method according to claim 1, wherein the internal circuit of the at least one light provider comprises a Radio Frequency Identification ("RFID") reader or a beacon reader.

10. The method according to claim 1, further comprising adjusting a total number of tag readers in the facility or a location of a tag reader in the facility based on the changes in the power levels.

11. The method according to claim 1, further comprising:

determining, based on the changes in the power levels, absence of the object at a first area prior to presence at a second area; and predicting that a theft is occurring based on the absence.

12. The system according to claim 2, wherein the first tags have known locations in the facility.

13. The system according to claim 2, wherein the computing device is configured to make a prediction that a theft is occurring based on detected and tracked movement.

14. The system according to claim 2, wherein the computing device is configured to perform a traffic analysis using the changes in the power levels.

15. The system according to claim 2, wherein the computing device is configured to use the changes to trigger certain operations of electronic devices in the read area or an adjacent area.

16. The system according to claim 15, wherein the electronic devices comprise at least one of a tag reader, a light, and a display.

17. The system according to claim 2, wherein the computing device is further configured to cause content displayed on a display screen, that is located in proximity to the at least one light provider, to be changed based on the changes in the power levels.

18. The system according to claim 2, wherein the internal circuit of the at least one light provider comprises a Radio Frequency Identification ("RFID") reader or a beacon reader.

19. The system according to claim 2, wherein the system is configured to cause an adjustment of a total number of tag readers in the facility based on the changes in the power levels, or to cause a change in a location of a tag reader in the facility based on the changes in the power levels.

20. The system according to claim 2, wherein the computing device is further configured to:

determine, based on the changes in the power levels, absence of the object at a first area prior to presence at a second area; and predict that a theft is occurring based on the absence.

* * * * *